Feb. 20, 1934.  G. SUNDBACK  1,947,956
FASTENER FORMING AND ASSEMBLING MACHINE AND METHOD
OF SECURING FASTENER ELEMENTS TO TAPE
Filed Dec. 19, 1928  8 Sheets-Sheet 1

Feb. 20, 1934.     G. SUNDBACK     1,947,956
FASTENER FORMING AND ASSEMBLING MACHINE AND METHOD
OF SECURING FASTENER ELEMENTS TO TAPE
Filed Dec. 19, 1928     8 Sheets-Sheet 2

INVENTOR.
Gideon Sundback
BY J. S. Wooster
ATTORNEY

Fig. 13.

Patented Feb. 20, 1934

1,947,956

UNITED STATES PATENT OFFICE 1,947,956

FASTENER FORMING AND ASSEMBLING MACHINE AND METHOD OF SECURING FASTENER ELEMENTS TO TAPE

Gideon Sundback, Meadville, Pa., assignor to Hookless Fastener Company, Meadville, Pa., a corporation of Pennsylvania Application December 19, 1928
Serial No. 327,069

27 Claims. (Cl. 153—1)

This invention relates to a fastener forming and assembling machine in which fastener elements are formed and attached to a holding strip such as a strip of corded tape and to a method of making fasteners. The present invention has for one of its objects to provide a forming and assembling machine of the character above referred to, which operates rapidly and efficiently.

Another object of the invention is to provide an improved method of making fasteners including several novel steps and novel combinations of steps.

A further object of the invention is to provide a machine in which the fastener elements are successively formed from metal stock and in which each fastener element is fastened to the holding strip immediately after it is formed.

A further object is to provide a machine in which the fastener elements are formed from metal stock in a reciprocating press and in which a fastener element is delivered from the press and fastened to the holding strip during each interval between forming strokes of the press.

A further object is to provide fastener positioning and attaching means which are directly operated from the reciprocating head of the press in proper timed relation with respect to the stroke of the press.

A further object is to provide means for delivering the fastener elements to the holding strip and for holding the strip and fastener elements in proper position with respect to each other while the fastener element is being clamped to the strip.

A further object is to provide fixed abutments on opposite sides of the strip at the point to which the fasteners are attached thereto against which the jaws of the fasteners are pressed to properly position the same with respect to the strip, together with means for compressing the jaws into clamping engagement with the strip.

A further object is to provide a reciprocating feeder for shifting the fastener element into engagement with the abutment, which is provided with the yielding actuating connections so that the fasteners will yieldably hold while their jaws are being compressed into clamping engagement with the strip.

A further object is to provide means in connection with the forming press to accurately position the metal stock with respect to the punches upon each stroke of the head.

With the above and other objects in view, the invention may be said to comprise the fastener forming and assembling machine and method as illustrated in the accompanying drawings hereinafter described and particularly set forth in the appended claims, together with such variations and modifications thereof as will be apparent to one skilled in the art to which the invention appertains.

There are various novel steps in the method which will be described specifically and various novel combinations of steps that can be carried out by more than one machine or by a single machine of any suitable construction.

Reference should be had to the accompanying drawings forming a part of this specification in which.

The present invention is employed in the manufacture of separable fasteners of progressively interlocking type which are employed to continuously interlock edge to edge flaps of flexible material.

The edges of the flaps have attached thereto at closely spaced points, jaw or fastener elements which are progressively interlocked or disengaged by means of a slider mounted for movement over the fastener elements of the two flaps. The fastener elements are ordinarily attached at regularly spaced points to holding strips which are secured along the edges of the flaps. The present invention in one of its aspects relates to a machine for forming the fastener elements and attaching them to a holding strip suitable for attachment to the flaps which are to be joined by the fastener.

Figures 1, 2, 3, 4, 14:
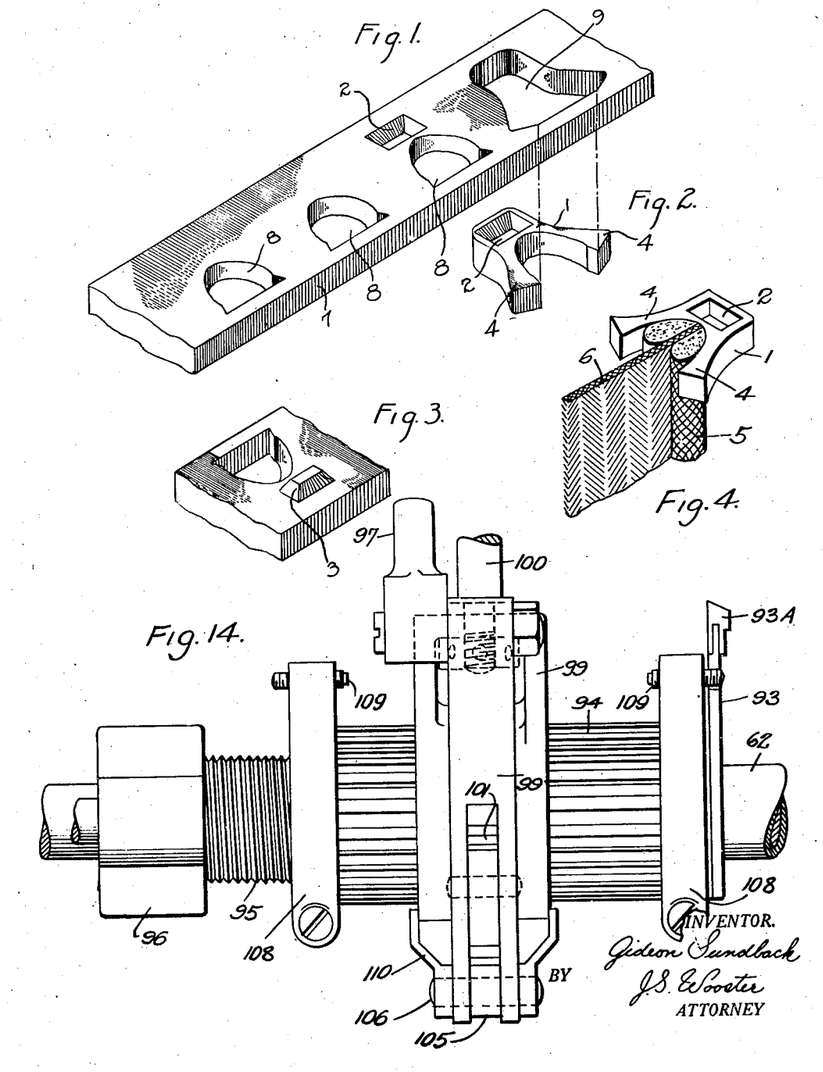
Figure 1 is an isometric view of a flat metal blank showing the operations that take place in forming a fastener element.
Fig. 2 is an isometric view showing a fastener element which has been severed from the metal stock.
Fig. 3 is an isometric view showing the reverse side of the metal blank.
Fig. 4 is an isometric view showing a fastener element in the position in which it is clamped to the corded tape.
Fig. 14 is a detail view showing the mechanism for controlling the intermittent actuations of the feed drum.

The fastener element 1 shown in Figs. 2 and 4 is provided at one end thereof with a recess 2 in one face and with a corresponding projection 3 on the opposite face, the projection 3 being formed to fit in the recess 2 of an identical fastener element, as well understood in the art.

The fastener element is also formed with spaced compressible jaws 4 which are adapted to straddle a cord 5 secured along an edge of a fabric tape 6, as shown in Fig. 4, and to be compressed into clamping engagement with the cord 5 to permanently secure the fastener element to the tape. The fastener elements are formed from a flat strip 7 of metal stock by first punching in the stock an opening 8 which corresponds to the space between the clamping jaws 4, then compressing the stock between suitable dies to form the recess 2 and projection 3, adjacent one end of the opening 8. The complete fastener element is then punched from the stock, leaving a large opening 9 therein of the same size and shape as the fastener element.

Figures 5, 6:
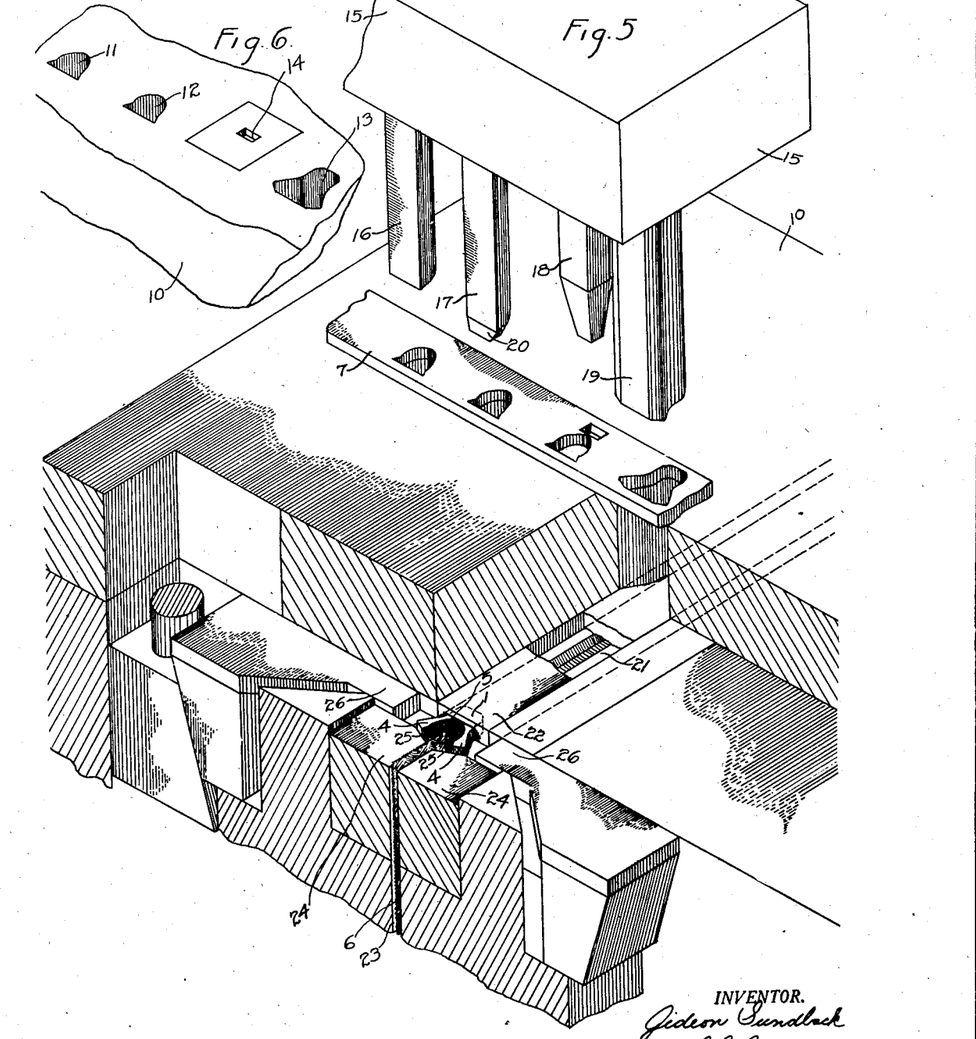
Fig. 5 is an isometric view showing the punch and die assembly, together with the plungers for transmitting the fasteners to strip engaging position and for clamping the fastener jaws on the corded edge of the tape.
Fig. 6 is an isometric view showing the opening in the die.

The fastener forming operations are performed in a suitable press such as illustrated in Figs. 5 and 6, the press being provided with a suitable bed 10 which has die openings 11 and 12 of the same size and shape as the openings 8 to be formed in the metal stock. The bed 10 also has a die opening 13 of the same size and shape as the fastener element and of the same size as the opening 9, which is formed in the metal stock when the fastener is punched from the stock. Midway between the openings 12 and 13 of the bed, the bed has a die recess 14 in which the projection 3 of the fastener element is formed. The press has a suitable head 15 which is mounted for reciprocation toward and from the bed 10 and this head carries punches 16 and 17 which are alined with the die openings 11 and 12 of the bed, and punch 18, which is alined with the die recess 14 and which has a point which conforms to the recess 2 of the fastener element. The head 15 also has a punch 19 which is in alinement with and conforms to the die opening 13 of the bed. As shown in Fig. 5 a positioning punch 17 is located between the punches 16 and 18 and is somewhat longer than the others. This punch has a tapered end 20 and it will be readily seen that it will enter one of the openings formed by punch 16 and position the piece of stock so that the other tools will act on the metal at the proper place.

Extending transversely beneath the opening 13 of the bed, there is a guideway 21 of substantially the same width as the opening 13 to receive the fastener elements discharged by the punch 19 and in this guideway, there is mounted a reciprocating plunger 22 for advancing the fastener elements in the guideway. At the front of the machine, the frame of the machine is provided with a slot 23 to receive the tape 6, which is supported in the slot 23 with its corded edge 5 toward the guideway 21, the slot 23 being positioned centrally of the guideway so that the jaws of the fastener elements may be advanced to a position in which they straddle the corded edge 5 of the tape.

In order to properly position the fastener element with respect to the tape, fixed abutments 24 are secured on opposite sides of the tape 6 at the end of the guideway 21 and these abutments have beveled edge portions 25 on the inner sides thereof with which the ends of the jaws 4 of the fastener elements engage.

For clamping the fastener elements on the tape, a pair of post plungers 26 are mounted on opposite sides of the tape for movement into and out of engagement with the jaws of the fastener element, straddling the tape and held against the abutments 24. The plungers 22 and 26 are operated in timed relation with respect to the movements of the head 15 of the press to move each fastener element as it is separated from the metal stock into engagement with the abutments 24 and to compress the jaws thereof into clamping engagement with the corded edge 5 of the tape to permanently secure the fastener element to the tape, the tape being continuously fed at a suitable rate to provide the desired spacing between the fastener elements.

Figure 7:
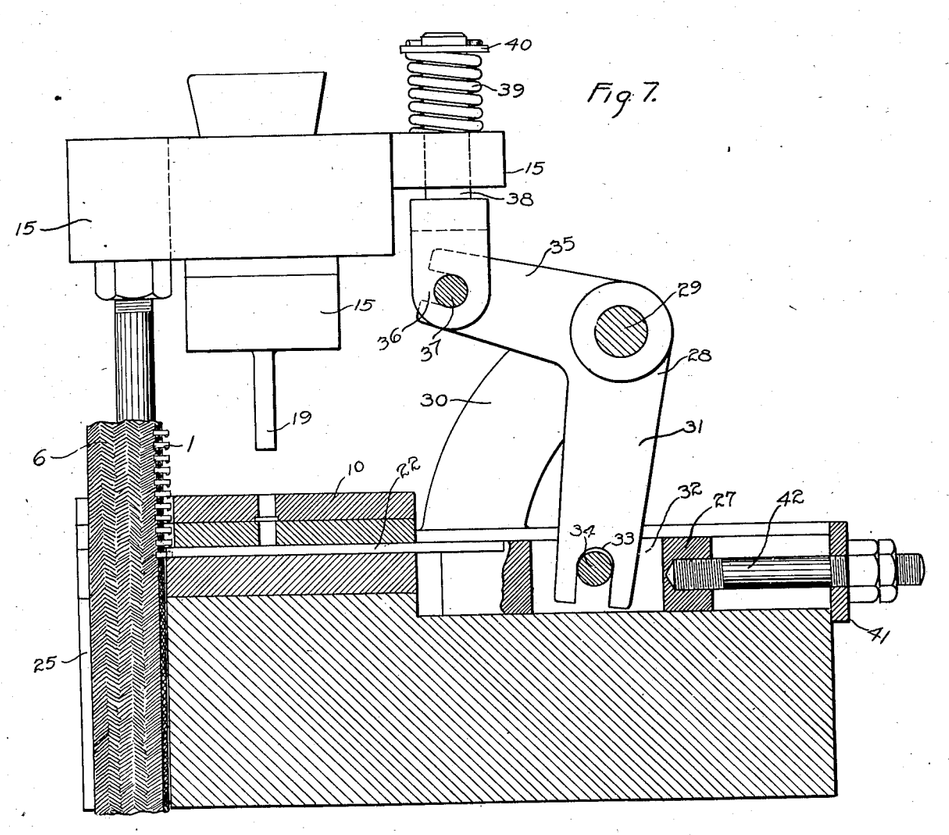
Fig. 7 is a vertical section taken on the line indicated at 7—7 in Fig. 8.

As best shown in Fig. 7 of the drawings, the plunger 22 is attached to a suitable slide 27 mounted in the guideway at the rear of the bed 10 and this slide is directly actuated from the head 15 of the press through a bell crank lever 28 which is mounted to swing on a fixed pivot 29 carried by a bracket 30 fixed to the frame of the machine. The bell crank lever 28 has a downwardly extending arm 31, the lower end of which extends into a slot 32 in the slide 27 and has a forked end 33 straddling a pin 34 extending across the slot 32 of the slide. The other arm 35 of the bell crank lever extends forwardly of the pivot 29 and has a forked end 36 straddling a horizontal pin 37 carried by the lower end of a vertical post 38 which is slidably mounted in the head 15. The post 38 is yieldably supported on the head 15 by means of a coil spring 39 which is interposed between the upper face of the head and a washer 40 secured upon the upper end of the post 38.

It will be apparent that when the head 15 moves upwardly, the bell crank lever 28 is rocked in a direction to move the slide 27 toward the bed 10 and plunger 22 toward the tape 6, the movement of the slide 27 being such that the plunger 22 is moved from a position in which its forward end is at the rear of the opening 13 to a position in which a fastener element engages with abutments 24, the spring 39 providing a yielding connection so that at the forward end of the stroke of the plunger 22, the fastener element is yieldingly pressed against the abutments 24 so that the fastener element is positively held during the action of the plungers 26 to compress the jaws into clamping engagement with the tape. To limit the forward movement of the slide 27 and plunger 22 and prevent excessive pressure from being exerted on the fastener element, the slide 27 is preferably provided with a stock bar 41 secured thereto by means of a bolt 42 which engages with the frame of the machine to limit the forward movement of the slide.

Figure 8:
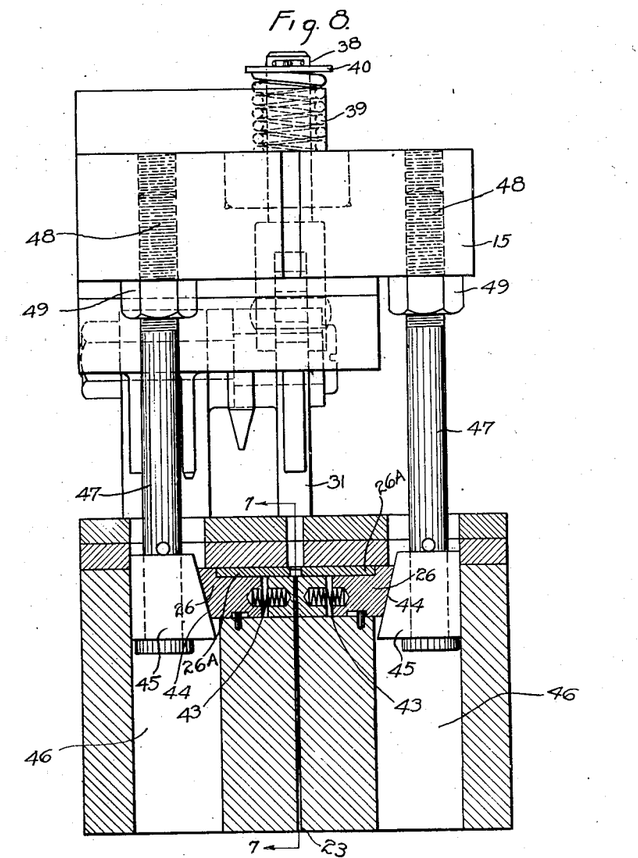
Fig. 8 is a sectional elevation showing the plungers for clamping the fasteners on the tape and the actuating means for these plungers.
Figure 9:
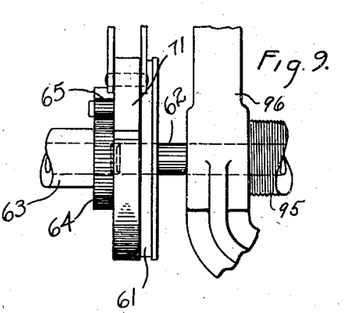
Figs. 9 and 10 are detail views of the tape feed mechanism.
Figure 10:
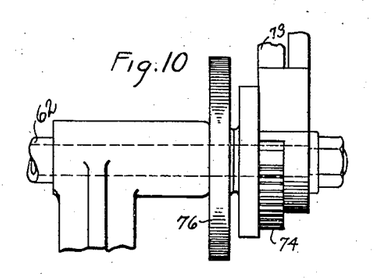
Figure 11:
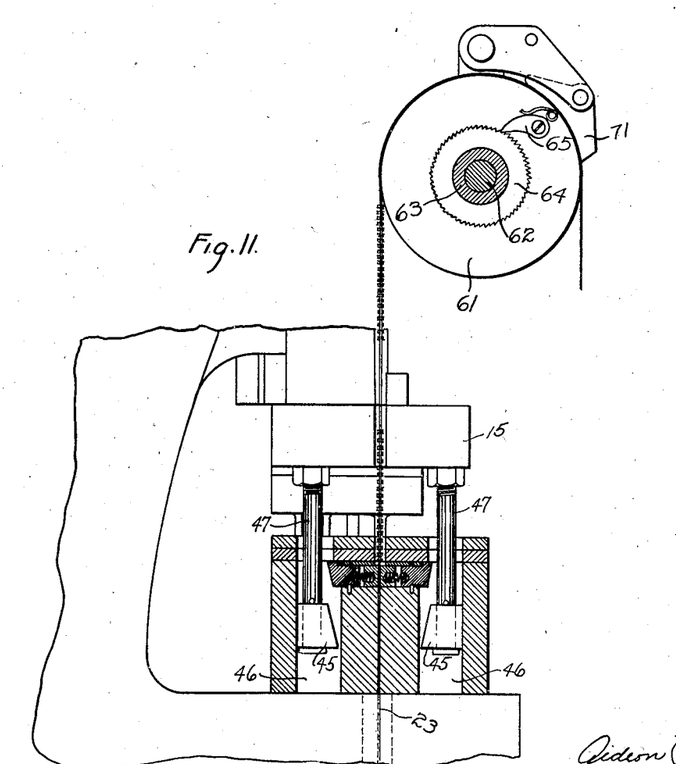
Fig. 11 is a vertical section taken on the line indicated at 11—11 in Fig. 12.

As best shown in Fig. 8 of the drawings, the jaw compressing plungers 26 have fastener engaging portions 26a in the form of hardened steel plates which have a thickness substantially equal to the thickness of the fastener elements and these plungers are normally held clear of the guideway 21 to permit the fastener element to be moved to a position between them by means of compression springs 43 interposed between the plungers and the fixed abutments 24. The plungers 26 have inclined outer ends 44 which are engaged by wedge members 45 mounted for vertical movement in slots 46 provided in the frame and attached to the lower ends of the vertical rods 47 fixed to the head 15 of the press.

The rods 47 have upper ends 48 threaded into the head 15 and are held in adjusted position with respect to the head by means of lock nuts 49. During the up stroke of the head 15, the wedge members 45 acting on the inclined faces 44 of the plungers 26 force the plungers inwardly against the jaw members 4 of a fastener element to compress the jaws into clamping engagement with the tape, the movement of the plungers 26 being so timed that they are brought into engagement with the fastener element immediately after the fastener element has been moved into engagement with the abutments 24 of the plunger 22.

As shown in Figs. 9 to 13, the reciprocating head 15 is suspended from and actuated by a crank shaft 50 which is continuously driven by any suitable means such as through a belt pulley 51, the frame of the machine being provided with suitable vertical guides 52 for the head.

Figure 13:
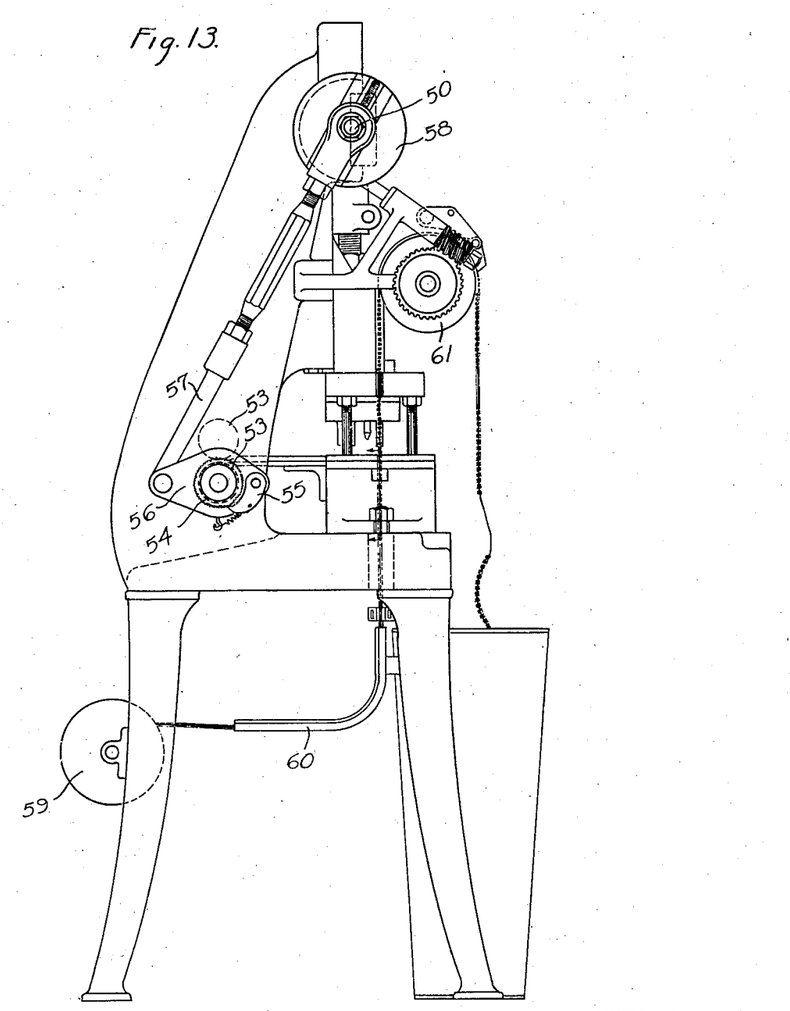
Fig. 13 is a side elevation of the machine.

In order to feed the metal stock 7 intermittently and at the proper rate across the bed 10, feed rollers 53 are provided as shown in Fig. 13 and one of these feed rollers is intermittently actuated through a ratchet 54 fixed to its shaft by means of a pawl 55 carried by a rocker arm 56 sleeved upon the shaft of the feed roller. The arm 56 is connected by an adjustable link 57 to an eccentric disc 58 with which the rod 57 has an adjustable connection so that the angular stroke of the rocker arm 56 may be varied to provide the desired feed for the strip 7 of the metal stock.

The fabric tape 6 is fed from a reel 59 through an angle guide 60 into a vertical guide slot 23 and movement is imparted to the tape by means of a drum 61 adjacent the top of the frame over which the tape passes. The drum 61 is fixed to a shaft 62 and is driven from a sleeve 63, which is rotatably mounted on the shaft 62, through a ratchet 64 fastened to the sleeve and a pawl 65 carried by the drum and engaging the ratchet. The sleeve 63 has fixed thereto a worm gear 66 which is driven by a worm 67 on a shaft 68 which has a helical gear 69 meshing with a helical gear 70 on the crank shaft 50. The drum 61 is thus driven at a rate so proportioned to the rate of operation of the punch carrying head as to provide the proper spacing between successive fastener elements applied to the tape.

The mechanism which has just been described will drive the feed drum at a continuous rate and it will be observed that for a very brief period of time the portion of tape at the clamping station will have to remain stationary until released by the side tools 26. The length of the strip between the clamping station and the feed drum is readily capable of sufficient stretching to allow the strip to be held stationary momentarily by the clamping jaws.

It is desirable, however, that means be provided for momentarily increasing the speed of movement of the tape at predetermined intervals to provide a relatively wide space between fastener elements so that the rows of fastener elements applied to the tape will be the required length for the particular fastener in which they are to be used.

It will be noted that the pawl 65 does not interfere with the rotation of the drum 61 at a rate faster than that of the sleeve 63 and ratchet 64 and in order to provide gaps at predetermined intervals between the fasteners on the tapes, means is provided for automatically advancing the drum 61 with respect to the ratchet 64 at predetermined intervals. The drum 61 is, however, engaged by a brake 71 which imposes a drag on the drum to prevent its over-running the ratchet except when positively actuated. The advancing movement of the drum 61 is accomplished by means of a trip controlled mechanism operated from the crank shaft which will now be described.

Figures 12, 17:
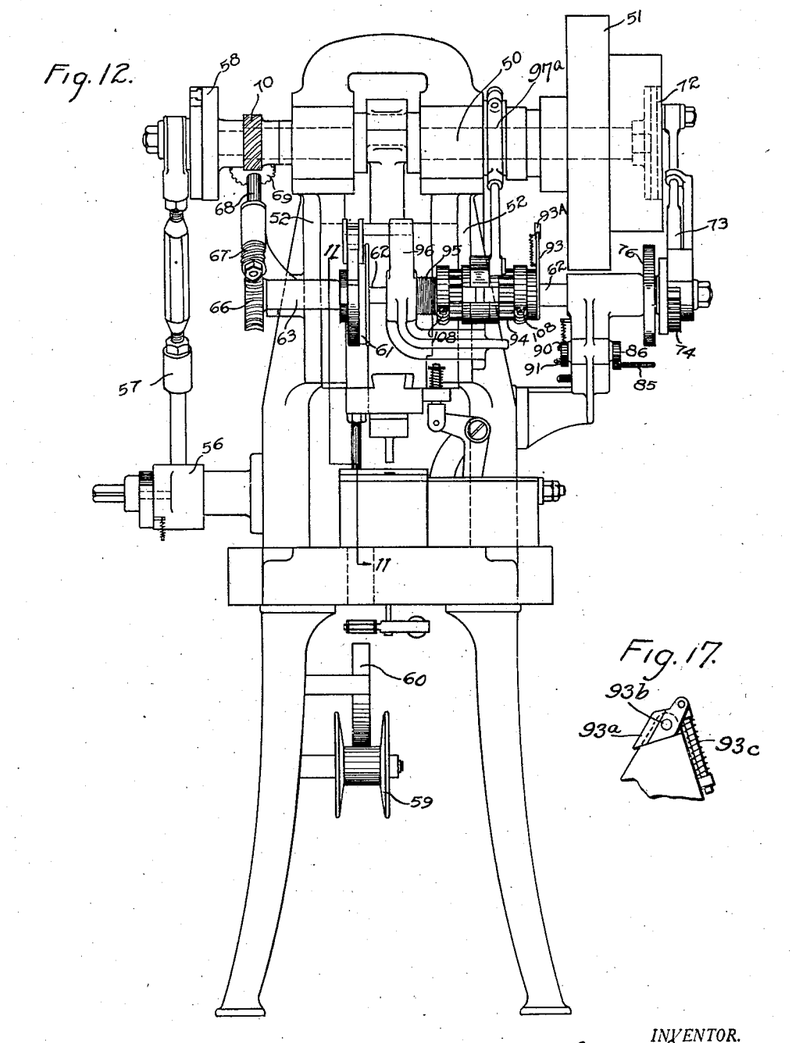
Fig. 12 is a front elevation of the machine.
Fig. 17 is a detail view of a portion of the feed control mechanism.
Figures 15, 16:
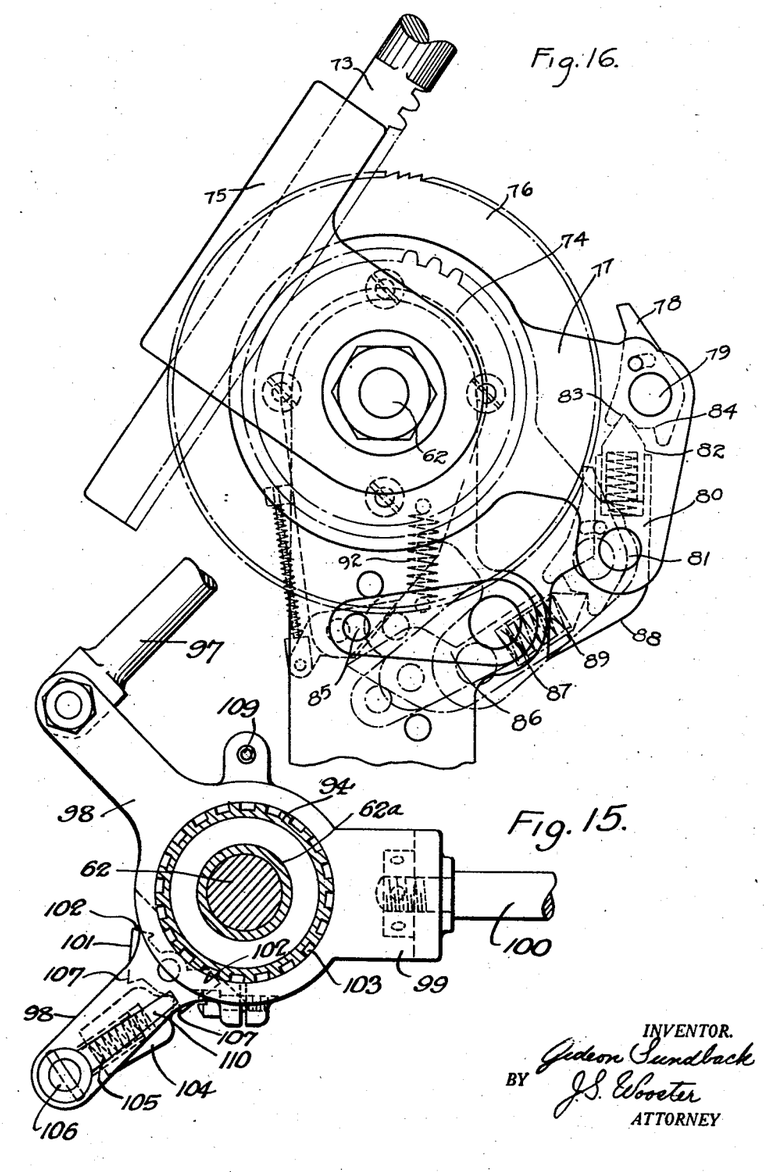
Fig. 15 is a transverse section through the mechanism shown in Fig. 14.
Fig. 16 is a detail view showing the ratchet and pawl mechanism by means of which the drum is periodically actuated.

At one end of the crank shaft 50, there is a crank 72, see Fig. 12, to which is connected a rack 73 which meshes with a pinion 74 loose on the shaft 62, see also Fig. 16, the rack 73 being held in engagement with the pinion 74 by means of a guide member 75 pivoted on the shaft 62. Upon each rotation of the shaft 50, the pinion 74 is oscillated through a relatively large angle on the shaft 62 and means is provided in connection with the pinion 74 for actuating the shaft 62 at predetermined intervals. To this end, a ratchet 76 is fixed to the shaft 62 alongside the pinion 74, and fixed to the pinion 74 there is a projecting member 77 which carries a pawl 78 which is normally held out of engagement with the ratchet 76, but which may be moved at intervals into engagement with the ratchet to impart rotation to the shaft 62.

The pawl 78 is mounted on a pivot pin 79 and is held either in or out of its ratchet engaging position by means of a trip lever 80 which is mounted intermediate its ends on a pivot pin 81 carried by the pawl carrier 77 and which carries at one end a spring pressed plunger 82 which has a pointed end engageable with closely spaced V notches 83 and 84 in the pawl 78.

When the lower end of the lever 80 is swung outwardly, the plunger 82 engages in the inner notch 83 of the pawl 78 and holds the pawl out of engagement with the ratchet as shown in full lines in Fig. 16. When the lower end of the lever 80 is swung inwardly, the plunger 82 engages in the notch 84 and holds the pawl in engagement with the ratchet as shown in phantom lines in said figure. The trip lever is actuated at intervals by means of a movably mounted trip pin 85 which may be shifted to a position to actuate the trip lever 80 at the end of the clockwise stroke of the carrier 77 in a direction to shift the trip lever 80 to a position in which it holds the pawl 78 in engagement with the ratchet during the succeeding counterclockwise stroke to impart a movement to the feed drum in excess of its normal rate of rotation in order to provide a relatively wide space between fastening elements applied to the strip. The trip pin 85 is attached to an arm 86 fixed to a shaft 87 journaled in the frame and is movable about the axis of the shaft 87 into and out of tripping position with respect to the lever 80. The oscillation of arm 86 is limited by stop members as indicated in Fig. 16. The lower end of the lever 80 has oppositely inclined faces 88 and 89, the former being engageable with the pin 85 in its tripping position to shift the lower end of the lever inwardly to engage the pawl 78 with the ratchet and the latter engaging with the pin in the non-tripping position thereof to return the pawl to inoperative position. The shaft 87 is provided with a second arm 90 having a laterally projecting pin 91 and this arm has connected thereto a spring 92 which acts to normally hold the shaft 87 at one limit of its movement with the pin 85 in its non-tripping position.

In order to cause the drum 61 to be advanced at proper intervals to space the fasteners on the strip, a trip arm 93 is caused to engage the pin 91 to swing the pin 85 and arm 86 to move the pin 85 to tripping position, the arm 93 being actuated through suitable timing mechanism from the shaft 50 so as to automatically speed up the feed of the strip after a predetermined number of fastening elements have been attached thereto.

As shown in Figs. 12 and 14, the arm 93 is attached to one end of a drum 94 which is mounted for rotative and endwise movement by means of a suitable bearing 62a as shown in Fig. 15. The other end of the drum is supported on the stationary screw 95 fixed to a bracket 96 carried by the frame of the machine, it being understood that the drum is threaded to cooperate with the screw 95 whereby axial movement is imparted to the drum when rotated. The arm 93 has at its outer end a member 93a pivoted thereto at 93b as shown in Fig. 17 which may rotate against the tension of spring 93c in one direction so that the trip arms 86 and 90 are actuated by the arm 93 in one direction only. Intermittent rotative movement is imparted to the drum by means of a connecting rod 97 which is eccentrically connected to the shaft 50 at one end and at its opposite end to a bell crank 98 which is mounted to oscillate about the drum between the two arms of a bracket 99 which encircle the drum. This bracket which is fixed to the frame of the machine by a bolt 100 maintains the bell crank in proper position when the drum moves axially. The bell crank 98 carries a double pawl 101, which is pivoted at its center and has detents 102 at its ends either of which is engageable in longitudinal grooves 103 in the periphery of the drum, one of the pawl detents serving to impart rotation to the drum in one direction and the other in the opposite direction as best shown in Fig. 15. The pawl is yieldingly held in either of its positions by means of a spring pressed plunger 104 mounted in an arm 105 fixed to a pivot pin 106 journaled in the bell crank 90 so that it may be swung to engage the plunger with either of two shoulders 107 at opposite ends of the pawl.

Means is provided for automatically shifting the arm 105 to reverse the pawl 101 and thereby reverse the direction of rotation of the drum and this means consists of collars 108 secured upon opposite end portions of the drum and having stop pins 109 which engage with lateral arms 110 fixed to opposite ends of the pivot pin 106 to shift the same. As the drum rotates and moves laterally on the screw 95, one or the other of the arms 110 comes into circumferential alinement with a stop pin 109 and as the drum rotates, is engaged by the pin which swings the arm 105 and reverses the position of the pawl 101.

The drum is thus alternately rotated in one direction and then the other and reciprocated axially. At one end of the axial reciprocation of the drum, the pin 91 is engaged by the arm 93 shifting the trip pin 85 into the path of the trip lever 80 so that at one end of its stroke, the pawl 78 is shifted into engagement with the ratchet 76 to impart a relatively rapid movement to the feed drum 61. The rotative movement of the drum 94 is relatively slow with respect to the rate of movement of the oscillating pawl carrier 77 so that the pin 85 will be held in tripping position by the arm 93 a sufficient length of time to trip the pawl 78 but during the time in which the carrier 77 is making a complete oscillation, the arm 93 will have been moved to a position releasing the pin 91 so that the trip pin 85 will be returned by the spring 92 to its normal position where it is engaged by the inclined face 89 of the trip lever and shifts the trip lever to the position in which it holds the pawl 78 out of ratchet engaging position.

Thus, upon a predetermined number of revolutions of the operating shaft 50, the feed drum is automatically advanced to provide a gap between the fastening elements applied to the strip so that there will be a predetermined number of fasteners closely and equally spaced along the strip and then a gap where the strip may be severed.

In order to vary the number of fasteners in a group, the collars 108 may be adjusted longitudinally of the drum 94 to increase or decrease the extent of axial movement of the drum and the number of rotations of the operating shaft between successive overrunning movements of the feed drum.

The machine of the present invention is adapted to operate efficiently at a very high rate of speed by reason of the fact that each fastener element is transferred to the tape and fixed thereto before another fastener element is separated from the metal stock. Furthermore, the fastener feed plunger and the clamping plungers are operated by very simple mechanical connections directly from the reciprocating head of the press so that the assembling and clamping operations are performed very rapidly and in exact timed relation to the movements of the head. In addition, the punching operations on the metal stock are kept very accurate by the positioning punch 17 which accurately alines the metal stock with respect to the punches and die openings upon each stroke of the press.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A machine for forming fastener elements and attaching the same to a strip and comprising a bed, a reciprocating head moving toward and from the bed, means for intermittently feeding metal stock across the bed beneath the head, cooperating means carried by the bed and head for forming fastener elements from said metal stock and separating the formed fastener elements one at a time from the stock, means for supporting and feeding the strip, and means actuated by said head for moving each fastener element as it is separated from the stock into engagement with the strip and for fastening the same to the strip.

2. A machine for forming fastener elements and attaching the same to a strip and comprising a bed, a reciprocating head moving toward and from the bed, cooperating means carried by said bed and head for forming fastener elements, a guideway beneath the bed onto which the formed fastener elements are delivered, means for supporting and feeding a strip across the end of said guideway, a plunger operated by said head for moving the fastener elements into engagement with said strip, and means operated by said head for attaching the fastener elements to said strip.

3. A machine for forming fastener elements and attaching the same to a strip and comprising a bed, a reciprocating head moving toward and from the bed, means for intermittently feeding metal stock across the bed beneath the head, a guideway beneath the bed, means carried by the head and bed for forming fastener elements from said stock and for delivering a fastener element upon each down stroke of the head into said guideway, means for supporting and feeding a strip across an end of the guideway, and means operating during each up stroke of the head to move a fastener element along the complete length of said guideway into engagement with the strip and to attach the fastener element to the strip.

4. A machine for forming fastener elements and attaching the same to a strip and comprising a bed, a reciprocating head moving toward and from the bed, means for intermittently feeding metal stock across the bed beneath the head, a guideway beneath the bed, means carried by the head and bed for forming from said stock fastener elements having spaced compressible jaws and for delivering a fastener element upon each down stroke of the head into the guideway, means for supporting and feeding a strip across an end of the guideway, a plunger in said guideway and operatively connected to the head for pushing each fastener element into engagement with the strip with the jaws straddling the strip, and opposed plungers operatively connected to the head for pressing the jaws into clamping engagement with the strip.

5. A machine for forming fastener elements and attaching them to a strip and comprising a bed, a vertically reciprocating head co-operating with the bed, means for intermittently feeding metal stock across the bed beneath the head, a guideway beneath the bed, means carried by the head and bed for forming fastener elements from said stock and for delivering a fastener element to said guideway upon each down stroke of the head, means for supporting and feeding a strip across an end of the guideway, means operatively connected to the head for moving a fastener element along the guideway into engagement with said strip upon each up stroke of the head, and means actuated by the head for attaching the fastener elements to the strip.

6. A machine for forming fastener elements and attaching them to a strip and comprising a bed, a vertically reciprocating head co-operating with the bed, means for intermittently feeding metal stock across the bed beneath the head, a guideway beneath the bed, means carried by the head and bed for forming from said stock fastener elements having spaced compressible jaws and for delivering a fastener element to the guideway upon each down stroke of the head, means for supporting and feeding a corded tape across an end of the guideway, opposed plungers on opposite sides of the tape, a plunger in said guideway for moving each fastener into a position between the opposed plungers with its jaws straddling the tape, and means for operating said opposed plungers during the intervals between successive down strokes of the head to engage the fasteners with the tape and clamp the same thereon.

7. A machine for forming fastener elements and attaching them to a strip and comprising a bed, a vertically reciprocating head co-operating with the bed, means for intermittently feeding metal stock across the bed beneath the head, a guideway beneath the bed, means carried by the head and bed for forming from said stock fastener elements having spaced compressible jaws and for delivering a fastener element to the guideway upon each down stroke of the head, means for supporting and feeding a corded tape across an end of the guideway, opposed plungers on opposite sides of the tape, a plunger in said guideway for moving each fastener into a position between the opposed plungers with the jaws straddling the tape, and means operatively connected with the head for actuating said plungers during each up stroke of the head to engage a fastener with the tape and clamp the same thereon.

8. A machine for forming fastener elements and attaching them to a strip comprising a bed, a vertically reciprocating head co-operating with the bed, means for intermittently feeding metal stock across the bed beneath the head, a guideway beneath the bed, means carried by the head and bed for forming from said stock fastener elements having spaced compressible jaws and for delivering a fastener element to the guideway upon each down stroke of the head, means for supporting and feeding a corded tape across an end of the guideway, opposed plungers on opposite sides of the tape, a plunger in said guideway for moving each fastener into a position between the opposed plungers with its jaws straddling the tape, means operatively connected to the head for operating the guideway plunger during the upstroke of the head, and separate means for operating said opposed plungers to compress the jaws of the fastener elements into clamping engagement with the tape.

9. A machine for forming fastener elements and attaching the same to a strip, comprising a bed, a vertically reciprocating head co-operating with the bed, a guideway beneath the bed, means for supporting and feeding a strip vertically across an end of the guideway and edgewise with respect thereto, means for intermittently feeding metal stock across the bed beneath the head, means carried by the head and bed for forming from said stock fastener elements having spaced compressible jaws and for delivering a fastener element to said guideway upon each down stroke of the head, a plunger in said guideway, opposed plungers on opposite sides of the strip, springs normally holding the latter plungers away from the strip, means operatively connecting the guideway plunger with the head for moving the same toward the strip during the up stroke of the head to shift a fastener element into a position in which its jaws straddle the strip, and wedge members movable with the head and acting upon the opposed plungers to simultaneously move them into engagement with the fastener jaws to compress the same into clamping engagement with the strip.

10. A machine for forming fastener elements and attaching the same to a strip, comprising a bed, a vertically reciprocating head co-operating with the bed, a guideway beneath the bed, means for supporting and feeding a strip vertically across an end of the guideway and edgewise with respect thereto, means for intermittently feeding metal stock across the bed beneath the head punches carried by the head and bed for punching from said stock fastener elements having spaced compressible jaws and for delivering a fastener element to said guideway upon each down stroke of the head, a plunger in said guideway, opposite plungers on opposite sides of the strip, springs normally holding the latter plungers away from the strip, a bell crank lever mounted on a fixed pivot and having one arm yieldingly connected to the head and its other arm connected to the guideway plunger, and means operatively connecting the head with the opposed plungers for operating the same in opposition to their springs to compress the jaws into clamping engagement with the strip.

11. A machine for forming fastener elements and attaching the same to a strip, comprising a bed, a vertically reciprocating head co-operating with the bed, a guideway beneath the bed, means for supporting and feeding a strip vertically across an end of the guideway and edgewise with respect thereto, means for intermittently feeding metal stock across the bed beneath the head, means carried by the head and bed for forming from said stock fastener elements having spaced compressible jaws and for delivering a fastener element to said guideway upon each down stroke of the head, a plunger in said guideway, opposed plungers on opposite sides of the strip, springs normally holding the latter plungers away from the strip, a bell crank lever mounted on a fixed pivot and having one arm yieldingly connected to the head and its other arm connected to the guideway plunger, and wedge members movable with the head and acting on said opposed plungers to move the same toward the strip to compress the jaws into clamping engagement therewith.

12. In a machine of the character described, a guideway, means for supporting and feeding a strip across the guideway centrally thereof with the strip disposed edgewise to the guideway, fixed abutments at the end of the guideway on opposite sides of the strip, means for delivering to the guideway at predetermined intervals fastener elements having spaced compressible jaws presented toward the strip, means associated with the guideway for advancing each fastener element to a position in which its jaws straddle the strip and engage said abutments and for yieldingly holding the fastener element against said abutments, and means for compressing said jaws into clamping engagement with the strip while the fastener element is so held.

13. In a machine of the character described, a guideway, means for supporting and feeding a strip across the guideway centrally thereof with the strip disposed edgewise to the guideway, fixed abutments at the end of the guideway on opposite sides of the strip, means for delivering to the guideway at predetermined intervals fastener elements having spaced compressible jaws presented toward the strip, a plunger in the guideway for advancing the fasteners to strip engaging position, a reciprocating actuator having a yielding connection with said plunger whereby the fastener element is yieldingly held between said plunger and said abutments at the end of the stroke of the plunger, and means for compressing said jaws into clamping engagement with the strip while the fastener element is yieldingly held against said abutments.

14. In a machine for affixing fastener elements to a strip, means for feeding the strip including a feed drum, a ratchet through which the drum is driven, a rotatable member having a pawl engaging said ratchet, means for continuously rotating said member, means independent of the pawl and ratchet for turning the drum in the direction in which it is turned by the pawl and ratchet, but at a higher speed, and means for intermittently actuating the last mentioned means, said actuating means being adjustable for varying the intervals between actuations thereof.

15. In a machine for affixing fastener elements to a strip, a drive shaft, fastener forming and affixing means operated by said shaft, means for feeding a strip past the affixing means including a feed drum, means including a pawl and ratchet for driving said drum at a uniform speed from said shaft, a second ratchet rotatable with said drum, a pawl mounted to swing about the axis of said second ratchet and engageable therewith, means operated by said drive shaft for oscillating the last mentioned pawl, means for normally holding said pawl out of engagement with said second ratchet, and means operated by said shaft for periodically engaging said pawl with said ratchet.

16. In a machine for affixing fastener elements to a strip, a drive shaft, fastener forming and affixing means operated by said shaft, means for feeding a strip past the affixing means including a feed drum, means including a pawl and ratchet for driving said drum at a uniform speed from said shaft, a second ratchet rotatable with said drum, a pawl mounted to swing about the axis of said second ratchet and engageable therewith, means operated by said drive shaft for oscillating the last mentioned pawl, means for normally holding said pawl out of engagement with said second ratchet, and means operated by said shaft for periodically engaging said pawl with said ratchet, said last mentioned means being adjustable to vary the intervals between actuations of said second ratchet by said pawl.

17. In a machine for affixing fastener elements to a strip, a drive shaft, fastener forming and affixing means operated by said shaft, means for feeding a strip past the affixing means including a feed drum, means including a pawl and ratchet for driving said drum at a uniform speed from said shaft, a second ratchet rotatable with said drum, a pawl mounted to swing about the axis of said second ratchet and engageable therewith, means operated by said drive shaft for oscillating the last mentioned pawl, means for normally holding said pawl out of engagement with said second ratchet, a fixed threaded member, a rotatable member in threaded engagement therewith, means operated by said shaft for rotating the latter member to advance the same on said first threaded member, means operable at predetermined intervals for reversing the direction of movement of the rotatable member, and means carried by the rotatable member for periodically engaging said pawl with said second ratchet.

18. In a machine of the character described, a drive shaft, a feed drum, a ratchet having a driving connection with said drum, a rotatable member mounted coaxially with said ratchet, a pawl carried by said rotatable member and engaging said ratchet, a driving connection between said drive shaft and rotatable member for continuously rotating the latter, and means periodically operated by said drive shaft for imparting to the drum a rotative movement at a speed in excess of that of said rotatable member, said last mentioned means being adjustable to vary the intervals between actuations of the drum thereby.

19. In a machine of the character described, a drive shaft, a feed drum, a ratchet having a driving connection with said drum, a rotatable member mounted coaxially with said ratchet, a pawl carried by said rotatable member and engaging said ratchet, a driving connection between said drive shaft and rotatable member for continuously rotating the latter, a second ratchet having a driving connection with said drum, a member mounted to swing about the axis of said second ratchet, means operated by said drive shaft for oscillating the latter member, a pawl carried by said member and engageable with said ratchet, means for normally holding the latter pawl out of engagement with the ratchet, and means operated by said drive shaft for periodically engaging said pawl with its ratchet.

20. In a machine of the character described, a drive shaft, a feed drum, a ratchet having a driving connection with said drum, a rotatable member mounted coaxially with said ratchet, a pawl carried by said rotatable member and engaging said ratchet, a driving connection between said drive shaft and rotatable member for continuously rotating the latter, a second ratchet having a driving connection with said drum, a member mounted to swing about the axis of said second ratchet, means operated by said drive shaft for oscillating the latter member, a pawl carried by said member and engageable with said ratchet, means for normally holding the latter pawl out of engagement with the ratchet, and means operated by said drive shaft for periodically engaging said pawl with its ratchet said last mentioned means being adjustable to vary the time intervals between actuations of the drum by the second pawl and ratchet.

21. The method of forming fastener elements of the type having spaced clamping jaws at one end and an interlocking projection and recess at the other end, including feeding a flat piece of metal, forming said projection and recess, cutting out portions to provide spaces between the clamping jaws of each element and afterwards severing the elements from the strip, said cutting out and severing being performed in separate operations.

22. The method of making a fastener stringer of the type having a flexible strip and fastener elements attached to said strip by clamping jaws at one end comprising forming interlocking projections and recesses in a flat strip of material, punching out material adjacent said recesses to provide spaces between the clamping jaws of the fastener elements when separated from the strip, severing the elements from the strip in a succeeding operation and attaching said fastener elements to the flexible strips at spaced intervals.

23. The method of forming fastener elements each having a recess and projection at one end and separated clamping jaws at the other end and attaching such elements to a strip comprising forming recesses and projections in said strip at spaced intervals, successively positioning said recesses and projections under a blanking punch and blanking out elements each of which includes a recess and projection, transferring said elements, one at a time, to a carrier strip, and pressing the jaws of said element together to clamp the same around the edge of said strip.

24. The method of forming fastener elements each having a recess and projection at one end and separated clamping jaws at the other end and attaching such elements to a stringer comprising feeding a flat strip of material, forming aligned recesses and projections in said strip of material, positioning said recesses and projections in turn under a blanking punch and successively blanking out elements from said strip each of which includes a recess and projection and jaws extending cross-wise of the strip, transferring said elements, one at a time, into attaching position with the clamping jaws astride a carrier strip and bending said jaws together to clamp the elements to said strip.

25. The method of making a fastener stringer of the type having a flexible strip and fastener elements attached in spaced relation to the edge of said strip comprising feeding a strip of metal, forming interlocking projections and recesses therein and punching out elements therefrom, each of which includes a projection and recess and shaped to provide separated clamping jaws at one end, feeding a fabric strip wholly out of the line of said metal feed, transferring the elements as punched from the metal strip to the fabric strip and positioning the same thereon with the jaw end astride the edge of the strip and clamping said jaws to the strip.

26. A machine for securing fastener elements to a supporting tape comprising continuously operable feeding means for feeding the tape under tension, fastener element clamping mechanism spaced from the feeding means for clamping the fastener elements to the tape, said element clamping mechanism being stationary whereby movement of the tape at the clamping station is temporarily arrested by the fastener element being clamped without arresting operation of said feeding means.

27. In a machine for affixing fastener elements to a strip, continuously operable feeding means for feeding the strip under tension continuously including a feed drum, means for normally driving said drum at a continuous uniform speed, means for periodically increasing the speed of rotation of the drum to provide gaps between groups of fastener elements on the tape, and means for intermittently feeding fastener elements to a position astride the edge of said strip and clamping them in position thereon.

GIDEON SUNDBACK.